United States Patent [19]

Fountain

[11] 3,776,625
[45] Dec. 4, 1973

[54] CONDITION RESPONSIVE ALERT SIGNAL FOR A MOVIE CAMERA

[75] Inventor: Gerald F. Fountain, Santa Monica, Calif.

[73] Assignee: Ponder & Best, Inc., Santa Monica, Calif.

[22] Filed: July 27, 1972

[21] Appl. No.: 275,689

[52] U.S. Cl. .................................. 352/170, 352/171
[51] Int. Cl. ............................................. G03b 1/60
[58] Field of Search ........................... 352/170, 171; 340/309.2; 95/53 E

[56] References Cited
UNITED STATES PATENTS

| 3,360,790 | 12/1967 | Rossitto | 340/309.2 |
| 3,463,072 | 8/1969 | Kiper et al. | 95/53 E |
| 3,004,250 | 10/1961 | Rensburg | 352/170 |
| 3,371,332 | 2/1968 | Call | 352/170 |

FOREIGN PATENTS OR APPLICATIONS

| 929,918 | 7/1947 | France | 352/170 |

Primary Examiner—Samuel S. Matthews
Assistant Examiner—Russell E. Adams, Jr.
Attorney—Charles G. Lyon et al.

[57] ABSTRACT

Circuitry for producing an alert signal for notifying a camera operator that a pre-determined length of time for filming has expired or that the film has come to the end of a reel. The alert signal is usually generated by an audio oscillator taking the form in a preferred embodiment of a single transistor ceramic transducer element oscillator. Also a visual alert signal observable in the camera viewfinger is disclosed.

13 Claims, 2 Drawing Figures

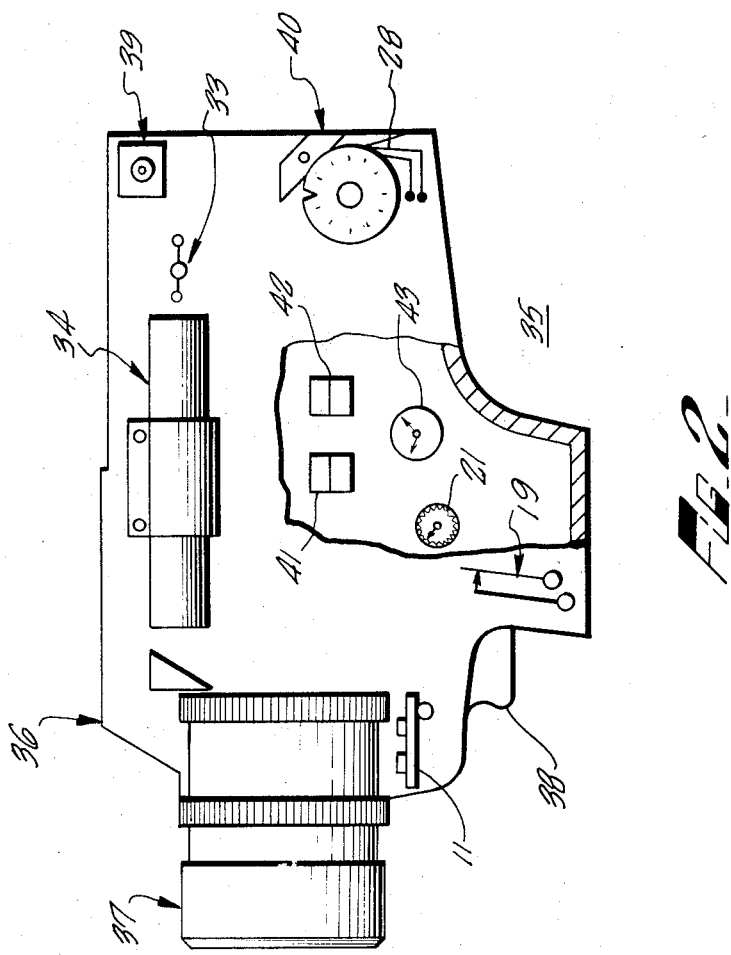

CONDITION RESPONSIVE ALERT SIGNAL FOR A MOVIE CAMERA

BACKGROUND OF THE INVENTION

This invention relates to movie cameras or the like, in which it would be advantageous to notify the camera operator that a specific length of time has expired during filming or that the film has come to the end of the reel.

Movie camera operators desire to achieve smooth scene continuity. In order to achieve this continuity, camera operators have resorted to timers external to their movie camera equipment or, as is more common, to approximations of time.

It is also desirous for the movie camera operator to have an indication when the film has come to the end of the reel without breaking his or her eye contact or waiting for a mechanical stoppage.

The foregoing problems have been substantially eliminated by providing an alert signal which will alert the movie camera operator that a specific length of time has expired since commencement of filming. This alert signal may, in addition, be utilized to notify the movie camera operator that the film has come to the end of the reel without breaking eye contact with the viewfinder.

SUMMARY OF THE INVENTION

It is an object of this invention to provide a new alert signal or indicator for movie cameras and the like.

It is an object of this invention to provide an audible alert signal and a visual indicator to alert a movie camera operator that a specific length of time for filming has expired.

It is another object of this invention to provide an audible alert signal and a visual indicator to alert the camera operator that the film has come to the end of the reel.

It is a further object of this invention to provide an audible alert signal by utilizing a single audio oscillator to notify the camera operator that he has been filming for a specific length of time and that the film has come to the end of the reel.

It is still a further object of this invention to provide a visual indicator in the line of sight of a view-finder to notify the camera operator that he has been filming for a specific length of time and that the film has come to the end of the reel.

Briefly stated and according to one aspect of my invention, the foregoing objects are achieved by producing a new and improved circuit in which a light emitting diode and an oscillator are activated when a specific length of time for filming has expired and when the film has come to the end of the reel.

BRIEF DESCRIPTION OF THE DRAWINGS

The invention, both as to its organization and principles of operation together with further objects and advantages thereof, may better be understood by reference to the following detailed description of an embodiment of the invention when taken in conjunction with the accompanying drawings in which:

FIG. 2 is an internal view of an exemplary embodiment of a movie camera in accordance with my invention.

DESCRIPTION OF THE PREFERRED EMBODIMENTS

Figure 1:
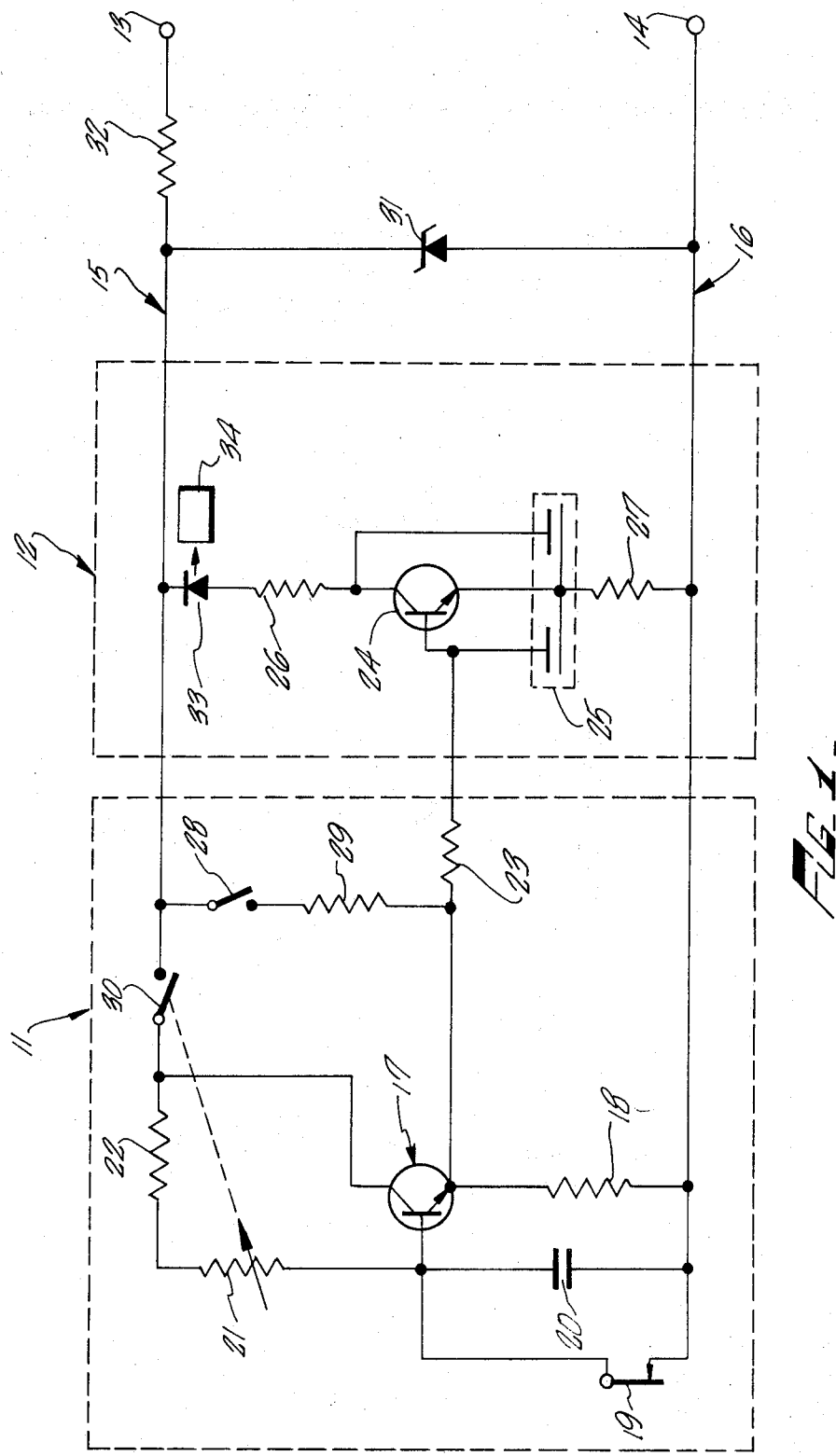
FIG. 1 is a circuit diagram illustrating an exemplary embodiment of the basic conepts of providing a visual indicator and an audible alert signal to both alert a movie camera operator that he has been filming for a specific length of time and that the film has come to the end of the reel, all in accordance with my invention.

Referring to FIG. 1, the circuit comprises a control unit or circuitry 11 which activates an alert signal unit 12 usually in the form of a transducer such as a buzzer or audio oscillator and a visual indicator, by controlling a source voltage applied to unit 12. This source voltage (not shown) is applied at terminal 13 of upper conductor 15 and at terminal 14 of lower conductor 16 to provide the proper voltage to circuitry 11 and to unit 12.

Circuitry 11 includes switching means or transistor 17 with a biasing resistor 18 connected between the emitter of transistor 17 and lower conductor 16. A capacitor 20 is connected between the base of transistor 17 and lower conductor 16 to provide a time delay for voltage which is introduced to capacitor 20 from the voltage source through fixed resistor 22 and variable resistor 21. Since resistor 21 which is mechanically coupled with on-off switch 20 is variable, the rate of charge time for capacitor 20 determines when transistor 17 is biased properly and therefore when it conducts.

A normally closed switch 19 coupled with a pistol grip trigger switch of a movie camera is connected between the base of transistor 17 and lower conductor 16 in a position to short capacitor 20 when switch 19 is closed. When switch 19 is opened, usually by the starting of an associated movie camera, capacitor 20 will charge and, after a delay determined by the charge time of capacitor 20, transistor 17 will be biased to a state of conduction and will apply a positive voltage through coupling resistor 23 to bias "on" transistor 24 in unit 12.

Circuitry 11 as described above, is one embodiment of a control unit which may be utilized. Another embodiment is an integrated circuit which is activated after a selectable time delay following operation of switch 19 by the trigger of the pistol grip.

In unit 12 transistor 24 and its associated ceramic transducer element 25, which may be of the type designated as PZT/UNIMORPH manufactured by Vernitron Corp., comprise an audio oscillator connected in a well-known electrical configuration to provide audio oscillations when transistor 24 is properly biased. Biasing resistor 26 is connected between the collector of transistor 24 and a visual indicator or light emitting diode 33 which is in turn connected to upper conductor 15. Biasing resistor 27 is connected between the emitter of transistor 24 and the lower conductor 16 (through ceramic transducer element 25).

Diode 33 and an associated viewfinder 34 are positioned internal to a movie camera to give the camera operator a visual indication whenever unit 12 is activated by circuitry 11.

A switch 28 is provided to initiate an audio signal when the film has come to the end of the reel. The audio oscillator comprising transistor 24 and ceramic transducer element 25 is activated when the base of transistor 24 receives a positive voltage (supplied at terminal 13) through switch 28 (normally open), fixed resistor 29 and coupling resistor 23. Fixed resistor 29 is connected to switch 28 at one end, and to a point between the emitter of transistor 17 and coupling resistor 23 at the other end.

An on-off switch 30, mechanically coupled with variable resistor 21, is provided in circuitry 11 in series in upper conductor 15 between the collector of transistor 17 and switch 28. Switch 30 when opened, provides means to disengage from operation the time delayed audible alert signal and the visual indicator, either prior to filming or once the time has expired and the alert signals have been activated. Switch 30 is arranged to be in its open state when resistor 21 is at one end of its travel, its extreme setting and this setting of the resistor 21 may correspond to the maximum rate of charge time of capacitor 20.

A zener diode 31 is connected across unit 12 between upper conductor 15 and lower conductor 16, and a resistor 32 is connected in series at terminal 13, to provide voltage regulation in a manner well-known in the art.

Turning now to FIG. 2, a movie camera 35 is illustrated with selected internal components exposed. The camera 35 basically comprises a housing 36, a main lens assembly 37, a viewfinder 34 and a pistol grip trigger 38. Trigger 38, when depressed, causes the opening of normally closed switch 19 or other suitable start contacts. Control unit 11 provides the circuitry to control the activation of an audible transducer unit 39 and a visual indicator such as a light emitting diode 33.

Diode 33 is positioned in the line of sight of the viewfinder 34 to visually indicate that an elapsed time for filming has expired or that the film has reached a predetermined length, such as the end of the reel. The elapsed time for filming is controlled by potentiometer or variable resistor 21 which determines the rate of charge time for capacitor 20 as shown in FIG. 1.

The alert signal which indicates that the film has reached a predetermined length is controlled by a footage counter assembly 40 driven by the film. Assembly 40 includes a footage wheel, a cam drive and a film switch 28. The film switch 28 includes contacts which are mechanically connected to the wheel of assembly 40, and these contacts close when the film has reached a predetermined point, such as the end of the reel. When switch 28 closes, the alert unit 12 will be activated and thus an audible and a visual alert indication will be given to the camera operator.

Further features which may be incorporated in camera 35 are an adjustable exposure meter 41, a film speed indicator 42 and a battery condition indicator 43.

In operation, the switch 30 is placed in its on or closed state. When an associated movie camera start switch is activated, normally closed switch 19, which is ganged to the movie camera switch, is opened, thus allowing capacitor 20 to receive a charge from the voltage source through resistors 32, 22 and 21. When the charge on capacitor 20 is sufficient to provide proper bias to transistor 17, conduction will occur and a positive output at the emitter of transistor 17 will result in a manner well-known in the art. Capacitor 20 will offer a time delay starting from when switch 19 is opened. Since resistor 21 is adjustable, the rate of charge time for capacitor 20 determines when transistor 17 will conduct and thus the filming time delay.

The positive voltage appearing at the output of transistor 17, in its conduction state, will be applied through coupling resistor 23 to bias "on" transistor 24. This produces audio oscillations preferably of approximately 2 kHz due to the particular phase characteristics and relationship in a single transistor ceramic transducer element audio oscillation unit, as is well-known in the art.

The operator will be able to stop the alert signal produced when a specific time for filming has expired by disengaging switch 19, or allowing switch 19 to return to its normally closed position and thus short capacitor 20. This removes the proper bias applied to the base of transistor 17 and switches transistor 17 into its non-conducting state. When transistor 17 is in a non-conducting state, the proper bias is not applied to the base of the transistor 24 in unit 12 and audio oscillations cease. When filming is commenced for the next scene, the sequence of events previously mentioned will occur over again.

When the film comes to the end, or at a predetermined length from the end of the reel, transistor 24 is biased into a conduction state to achieve audio oscillations by closing normally open switch 28 to allow a voltage to be applied to the base of transistor 24 to bias this transistor "on" and thus cause transistor 24 to conduct and produce audio oscillations.

Since diode 33 will be activated (emit light) when unit 12 is activated, its utilization as a visual indicator lies in combination with or absent from an accompanying audible signal. This stems from the placement of the diode 33 in the line of sight of the viewfinder 34 internal to the movie camera. Thus diode 33 will allow a camera operator to retain his eye contact while filming and still be alerted that a predetermined time of filming has elapsed or that a predetermined amount of film remains on the reel.

Values utilized in the preferred embodiment of this invention which allows a signal variation up to approximately 30 seconds are as follows: capacitor 20 – 2,000 — microfarads resistor 18 – 22,000 ohms
resistor 21 – 50,000 ohms
resistor 22 – 10,000 ohms
resistor 23 – 15,000 ohms
resistor 26 – 1,500 ohms
resistor 27 – 330 ohms
resistor 29 – 47,000 ohms
transistor 17 – Type 2N2926
transistor 24 – Type 2N2926
applied at terminal 13 – 6V
applied at terminal 14 – 0V
zener diode 31 – 5V It has been shown that by providing an audio oscillator comprising a single transistor and a ceramic transducer element and a visual indicator such as a light emitting diode that reliable alert signals can be accomplished in a movie camera environment to alert the camera operator that a specific length of time for filming has expired and that the film has come to the end of the reel.

While an embodiment and application of this invention has been shown and described, it will be apparent to those skilled in the art that many modifications are possible without departing from the inventive concepts herein described. The invention, therefore, is not to be restricted except as is necessary by the prior art and by the spirit of the claims.

What is claimed is:

1. In a movie camera adapted to receive movie film, a circuit comprising
    audible alert means for producing an audible alert signal capable of notifying the camera operator that a pre-determined time of filming has expired in response to a pre-determined condition,
    first switching means for providing the predetermined condition when said first switching means is in a first state,
    delay means for delaying the first state of said first switching means for a pre-determined time,
    and control means for activating said delay means in response to an initiation of a filming sequence.

2. Apparatus as in claim 1 wherein said delay means is a capacitor and said pre-determined time is determined by the charge time of said capacitor.

3. Apparatus as in claim 2 further including means for terminating the audible alert signal produced by said audible alert means in response to a termination of the filming sequence.

4. Apparatus as in claim 1 wherein said audible alert means is an audio oscillator.

5. Apparatus as in claim 1 further including a second switching means electrically connected to said audible alert means for providing the pre-determined condition to said audible alert means to indicate the end of the movie film.

6. A movie camera adapted to receive a reel of film comprising
    a switch for initiating and terminating movement of the film,
    stimuli producing means within said camera for producing an electrical signal providing an audible alert means representing a preset filming period, said audible alert means being initiated by the operation of said switch and activated by said electrical signal a pre-determined time thereafter representa-tive of said filming period.

7. A movie camera as in claim 6 wherein said camera includes an electrical-to-visual transducer and a visual alert.

8. A movie camera as in claim 6 wherein
    said movie camera comprises a viewfinder, and said camera includes a visual indicator responsive to said electrical signal for producing a visual alert indication, said visual indicator being positioned internal to the movie camera and observable in said viewfinder.

9. A movie camera as in claim 8 wherein
    said visual indicator is a light emitting diode.

10. A movie camera as in claim 6 wherein said audible alert means further is initiated at the occurrance of the end of the film.

11. A movie camera as in claim 10 including
    counter means for indicating the length of the film remaining on the reel,
    a film switch responsive to a predetermined count of said counter means, and
    means for activating said stimuli producing means at the pre-determined count of said counter means.

12. A movie camera as in claim 10 wherein
    said camera includes an electrical-to-audio transducer and said alert comprises an audio alert.

13. A movie camera as in claim 10 wherein
    said movie camera includes a viewfinder, and
    said camera comprises a visual indicator responsive to said electrical signal for producing a visual alert indication, said visual indicator being positioned internal to the movie camera and observable in said viewfinder.

* * * * *

UNITED STATES PATENT OFFICE
CERTIFICATE OF CORRECTION

Patent No. 3,776,625          Dated  December 4, 1973

Inventor(s)    Gerald F. Fountain

It is certified that error appears in the above-identified patent and that said Letters Patent are hereby corrected as shown below:

In the abstract, line 8, change "viewfinger" to --viewfinder--.

In Column 1, line 66, change "conepts" to --concepts--.

In Column 2, line 25, change "20" to --30--.

In Column 5, claim 4, line 1 change "1" to --3--.

In Column 6, claim 6, line 2 change "presenta-tive" to --presentative--.

Signed and sealed this 16th day of July 1974.

(SEAL)
Attest:

McCOY M. GIBSON, JR.          C. MARSHALL DANN
Attesting Officer             Commissioner of Patents